(12) United States Patent
Correia de Castro et al.

(10) Patent No.: US 8,291,841 B2
(45) Date of Patent: Oct. 23, 2012

(54) MOTORCYCLE SUPPORT

(76) Inventors: José Ricardo Gonçalves Correia de Castro, Santa Maria da Feira (PT); Sérgio Bruno de Oliveira Tavares, Cesar OAZ (PT)

( * ) Notice: Subject to any disclaimer, the term of this patent is extended or adjusted under 35 U.S.C. 154(b) by 288 days.

(21) Appl. No.: 12/378,219

(22) Filed: Feb. 12, 2009

(65) Prior Publication Data
US 2010/0199890 A1 Aug. 12, 2010

(51) Int. Cl.
*A47B 3/00* (2006.01)
(52) U.S. Cl. ........................................ 108/162; 182/161
(58) Field of Classification Search ................ 211/17, 211/22, 70.1, 70.6, 85, 189, 195, 198; 182/124–126, 182/156; 248/176.1, 168, 352, 165, 166, 248/170, 150, 136
See application file for complete search history.

(56) References Cited

U.S. PATENT DOCUMENTS

| | | | | | |
|---|---|---|---|---|---|
| 4,437,413 | A | * | 3/1984 | O'Brian et al. | 108/162 |
| 5,722,507 | A | * | 3/1998 | Kain | 182/129 |
| 5,762,163 | A | * | 6/1998 | Kain | 182/161 |
| 6,550,579 | B2 | * | 4/2003 | Gibson et al. | 182/161 |
| 6,886,660 | B2 | * | 5/2005 | Sapatova | 182/33 |

* cited by examiner

*Primary Examiner* — Amy Sterling
*Assistant Examiner* — Erin W Smith
(74) *Attorney, Agent, or Firm* — Mark E. Wiemelt

(57) ABSTRACT

A portable, lightweight collapsible motorcycle stand and method of use is presented. The motorcycle stand comprises a platform, two support members rotatably affixed to opposite outer edges of the platform, and a shelf for storing tools and the like. The shelf reversible affixes to cross bars located on the two support members. The shelf is removable, thereby enabling collapsing of the motorcycle stand. The shelf is secure to the collapsed stand via shelf hooks and the entire apparatus is lock into a collapsed position through use of a cross bar hook. Alternate embodiments and their method of use are provided as well.

10 Claims, 18 Drawing Sheets

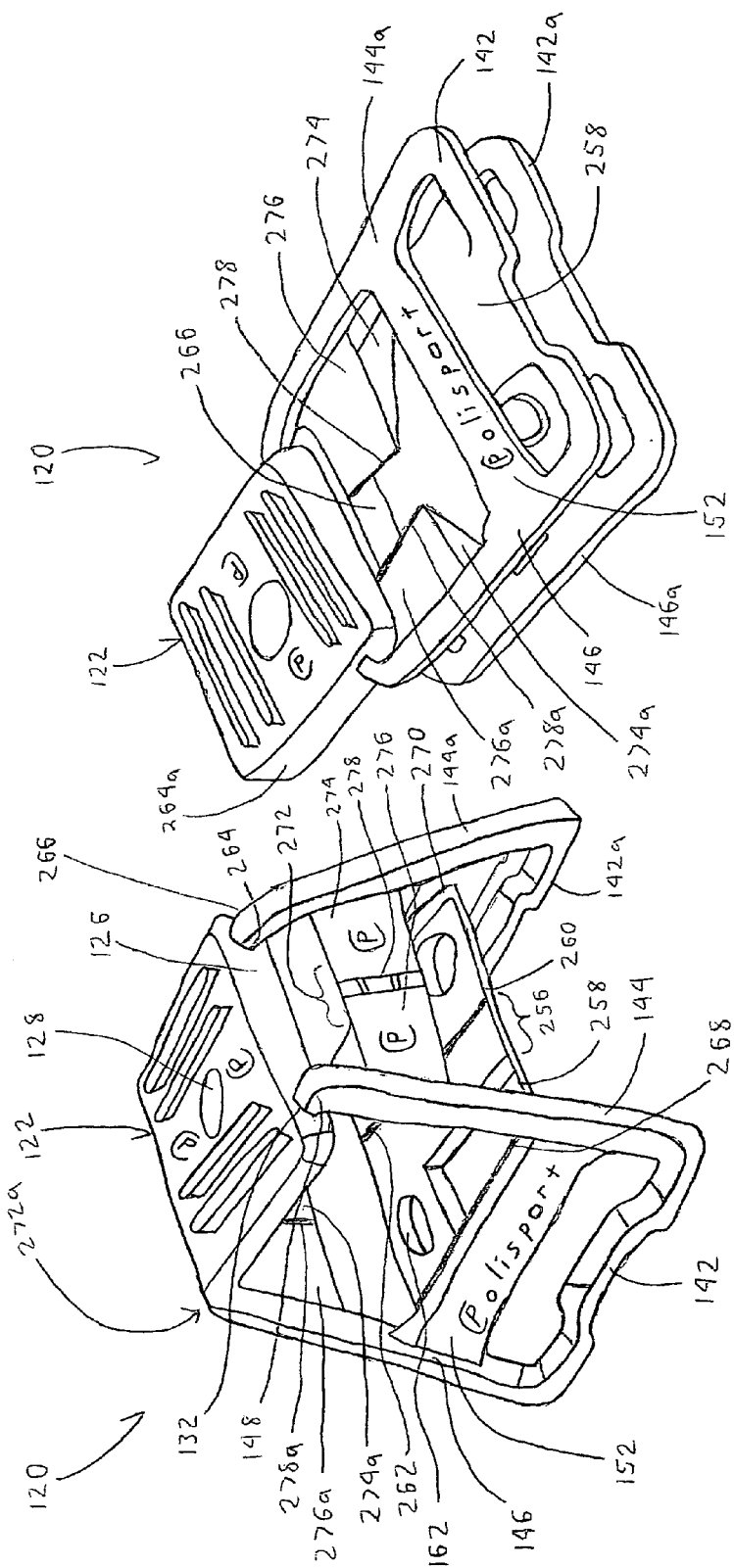

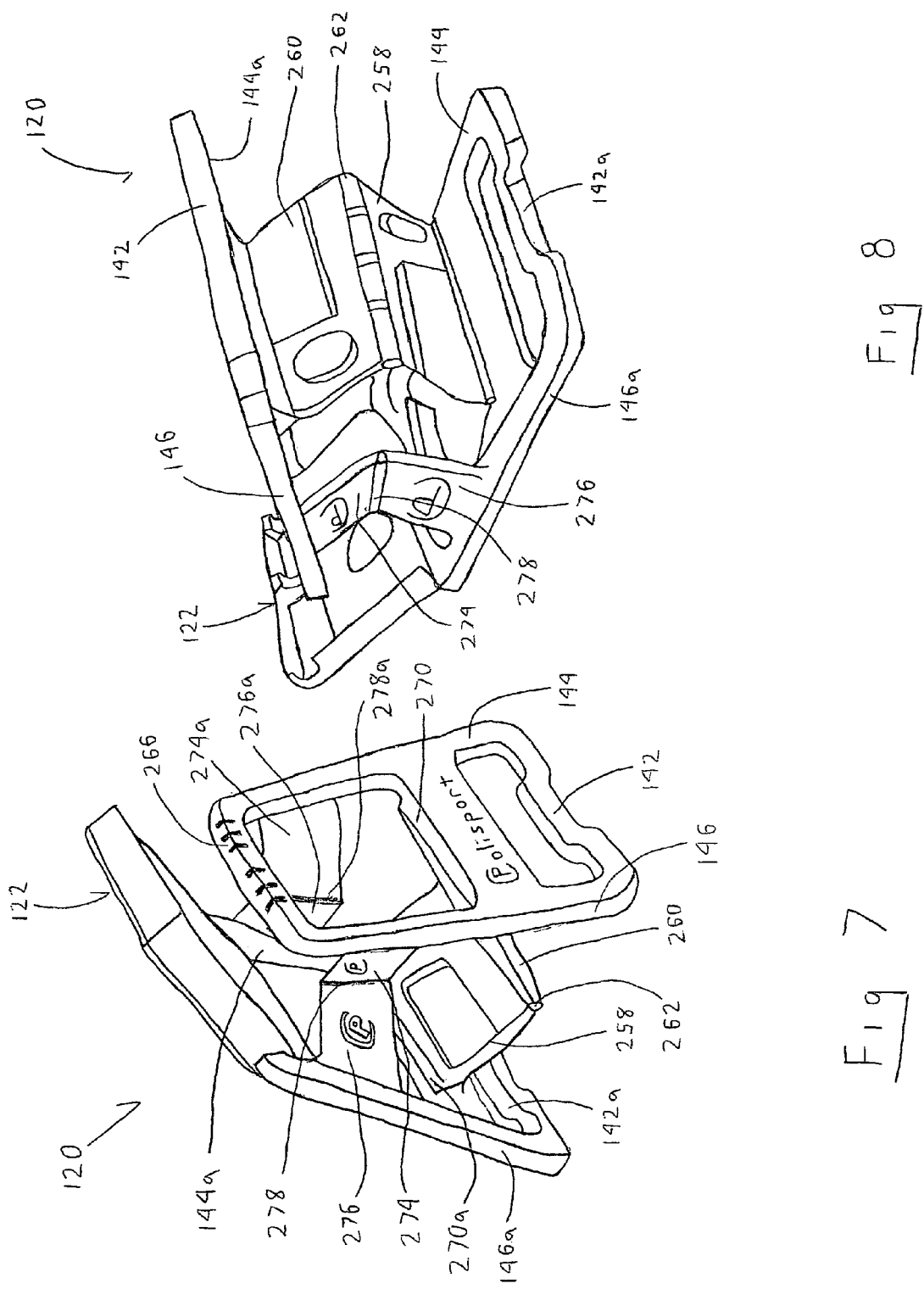

MOTORCYCLE SUPPORT

I. TECHNICAL FIELD

The present invention relates to stands for supporting motorcycles and, more particularly to a lightweight, portable, collapsible motorcycle stand enabling easy access to components of a motorcycle.

II. BACKGROUND OF THE INVENTION AND PRIOR ART

Motorcycle maintenance or repair requires that, in most instances, the motorcycle be in an upright position with its varied and many components accessible to the mechanic. Storing or displaying a motorcycle also requires the motorcycle to be in an upright position. Of course, this must be done such that the motorcycle is stable so as to prevent it from tilting or falling thereby causing damage to the motorcycle or injury to a bystander. Often times an external support mechanism is used for placing the motorcycle into proper position.

While useful in many settings, the use of a support is of particular importance in motorcycle racing as racing motorcycles generally do not have kickstands and cannot, therefore, stand on their own. Also, it is often required that racing motorcycles be quickly placed into an accessible, upright raised position so that repairs can be made during the course of an event. A support stand should ideally also be compact, lightweight, and portable as space is limited and time is of the essence in the racing environment. It s also important that tools be easily accessible and not become misplaced.

There have been several attempts to create a suitable motorcycle support device. However, the prior art attempts are not with their shortcomings. Prior art solutions are either too bulky, too heavy, unstable, or not portable enough to be of ultimate benefit to a mechanic, particularly in racing. Further, prior art stands do not allow for the storage of tools on the stand.

Accordingly, there is need for a lightweight, collapsible, and portable motorcycle stand that enables quick deployment and access to the lower aspects of a motorcycle while also providing a compact profile for storage. Further, such a device would provide for the storage of tools and other items required to repair or maintain a motorcycle. Such a device is provided for in the disclosed invention.

III. OBJECTS AND ADVANTAGES OF THE INVENTION

It is an object of the present invention to provide a portable motorcycle stand that is collapsible thereby providing a compact profile.

It is a further object of the present invention to provide a motorcycle stand that is lightweight yet durable.

It is yet a further object of the present invention to provide a motorcycle stand that enables access to the lower aspect of a motorcycle.

It is yet a further object of the present invention to provide a motorcycle stand that provides a stable support to a motorcycle.

It is another object of the present invention to provide a motorcycle stand that is easy to use and can be deployed quickly.

It is another object of the present invention to provide a motorcycle stand that provides for the storage of items.

An advantage of the present invention is that it enables a user to quickly deploy the stand and mount a motorcycle in a stable fashion.

It is yet a further advantage of the present invention that such a motorcycle stand is collapsible provides a compact profile yet is portable.

It is yet a further advantage of the present invention that such a motorcycle stand will be lightweight yet durable and strong.

It is yet a further advantage of such a motorcycle stand that it will enable a user to store tools or other items on the stand while in a deployed position.

IV. SUMMARY OF THE INVENTION

The above objects and advantages are provided for in the inventive collapsible motorcycle stand (also referred to throughout as "apparatus"). In the preferred embodiment, the apparatus is made of a hard, durable plastic; however, any lightweight, durable, rigid material can be used. The apparatus comprises a platform adapted to receive two support members which can move freely within platform support member receptacles. The platform is generally a rectangular shape (including a square). Each support member further including a cross bar, the cross bars further adapted to receive a shelf. The cross bar of the first support member is adapted to accept one end of the shelf in a hinge and the cross bar of the second support member is adapted to receive the other end of the shelf in a reversible hooking mechanism. The shelf is designed for holding tools and other items and may optionally include one or more containers for holding tools or other items. The first end of the shelf rotatably affixes to the first support member cross bar via the hinge and the second end of the shelf reversibly affixes to the second support member cross bar via the hooking mechanism.

To deploy the apparatus from a collapsed position into an open, usable position, a user places the collapsed apparatus in a vertical position and applies horizontal force to the platform, thereby moving the platform to a horizontal position. This, in turn, causes the support members, which can move freely about their respective platform support member receptacles, to remain in an essentially vertical position; however, the support members are moved a distance from one another on a horizontal plane as a result of the platform moving to a horizontal position. The shelf is then rotated about its hinge on the first support member cross bar and locked into a horizontal working position using the hooking mechanism of the second end of the shelf.

In an alternate embodiment, the shelf is a two-piece member further comprised of a first section and a second section, the first and second sections being connected to one another via a leaf hinge and, further, the first end of the shelf and the second end of the shelf are rotatably affixed to the support member cross bars via two additional leaf hinges. It should be noted that while a leaf hinge is used in the description, those skilled in the arts will appreciate that any type of hinge can be used, including but not limited to a piano hinge or a living hinge.

In this alternate embodiment, two two-piece hinged cross bar members extend horizontally between the support members, one cross bar member on each side of the apparatus. In this embodiment, the apparatus is also deployed from a collapsed position by exerting horizontal force on the platform so that it comes to rest in a horizontal position. Likewise, the support member swing freely, maintaining an essentially vertical position. As the support members part from one another, the two-piece shelf unfolds to a horizontal position while the hinged cross bar members also unfold to a vertical open position. The hinged cross bar members then locked into position.

In another alternate embodiment, the apparatus comprises a top (platform) section that is further comprised of a first section and a second section, the first and second sections being connected to one another via a hinge.

The top further includes a handle, the handle comprising a circular cut out, half of which is contained within the first section and half of which is contained in the second section and further including an interior space, the handle further including a semi-circular lifting member of a size such that it nestles into the cut out, the lifting member being rotatably affixed to the first section in the interior space of the cut out. Additionally, the upper surface of the top will preferably include a non-slip surface feature.

Rotatably attached to opposite outer edges of the top parallel with the top hinge are first and second rigid members. These members further include a top edge and a bottom edge, a first lateral edge and a second lateral edge. First and second rigid members are affixed to the top via a hinge.

The apparatus further includes a first collapsible support member and a second collapsible support member. Each of the support members is comprised of support member first portion and a support member second portion, the first support member portion and the second support member portion being joined via a hinge. The first collapsible support member is then rotatably affixed to the first lateral edge of the first rigid member and the second lateral edge of the second rigid member. The second collapsible support member is similarly affixed to the opposite lateral edges of the second and first lateral edges of the first and second rigid members.

Thus, with respect to the top, the rigid member are rotatably affixed to opposite outer edges of the top parallel to the hinge in the top. The first and second collapsible support members being affixed to the first and second rigid members adjacent to the outer edges of the top and perpendicular to the top hinge.

When in an open position (described below), the angle created by the first rigid member top edge and the bottom edge with respect to the top is greater than 90 degrees and the angle created by the second rigid member top edge and the bottom edge with respect to the top is greater than 90 degrees, the angles created by the first rigid member and the second rigid member being equal to one another.

Viewed from the top, the first collapsible support member and the second collapsible support member open to a position wherein a concave angle (with respect to the top) is created. The angle provides additional stability and support strength not seen in the prior art. Also viewed from the top, first and second collapsible support members create an angle from their respective top edges and bottom edge with respect to the top is greater than 90 degrees, the angles created by the first collapsible support member and the second collapsible support member being equal to one another.

To use the apparatus a user exerts downward force on the top such that the first section and the second section rotate about the hinge to a horizontal position and the first and second collapsible support members rotate about their hinge to a flat position such that the second outer edge and the fourth outer edge of the top come to rest on the top edge of the first collapsible support member and second collapsible support member, respectively. Alternatively, a user could exert outward pressure on the hinges of the first and second collapsible support members, thereby causing the top to unfold into position.

When in an open, usable position, the top unfolds into a flat surface as do the first and second collapsible support members. The outer edges of the top adjacent to the first and second collapsible support members rest on the upper edges of the support members. Thus a stable working platform is created.

There has been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

V. BRIEF DESCRIPTION OF THE DRAWINGS

FIG. 6 is a perspective view of an alternate embodiment of the inventive apparatus including a two-piece shelf and support member cross bars.

FIG. 7 is a perspective view of an alternate embodiment of the inventive apparatus in a partially collapsed position.

FIG. 8 is a perspective view of an alternate embodiment of the inventive apparatus in a further partially collapsed position.

FIG. 9 is a perspective view of an alternate embodiment of the inventive apparatus in a collapsed position.

Figure 11:
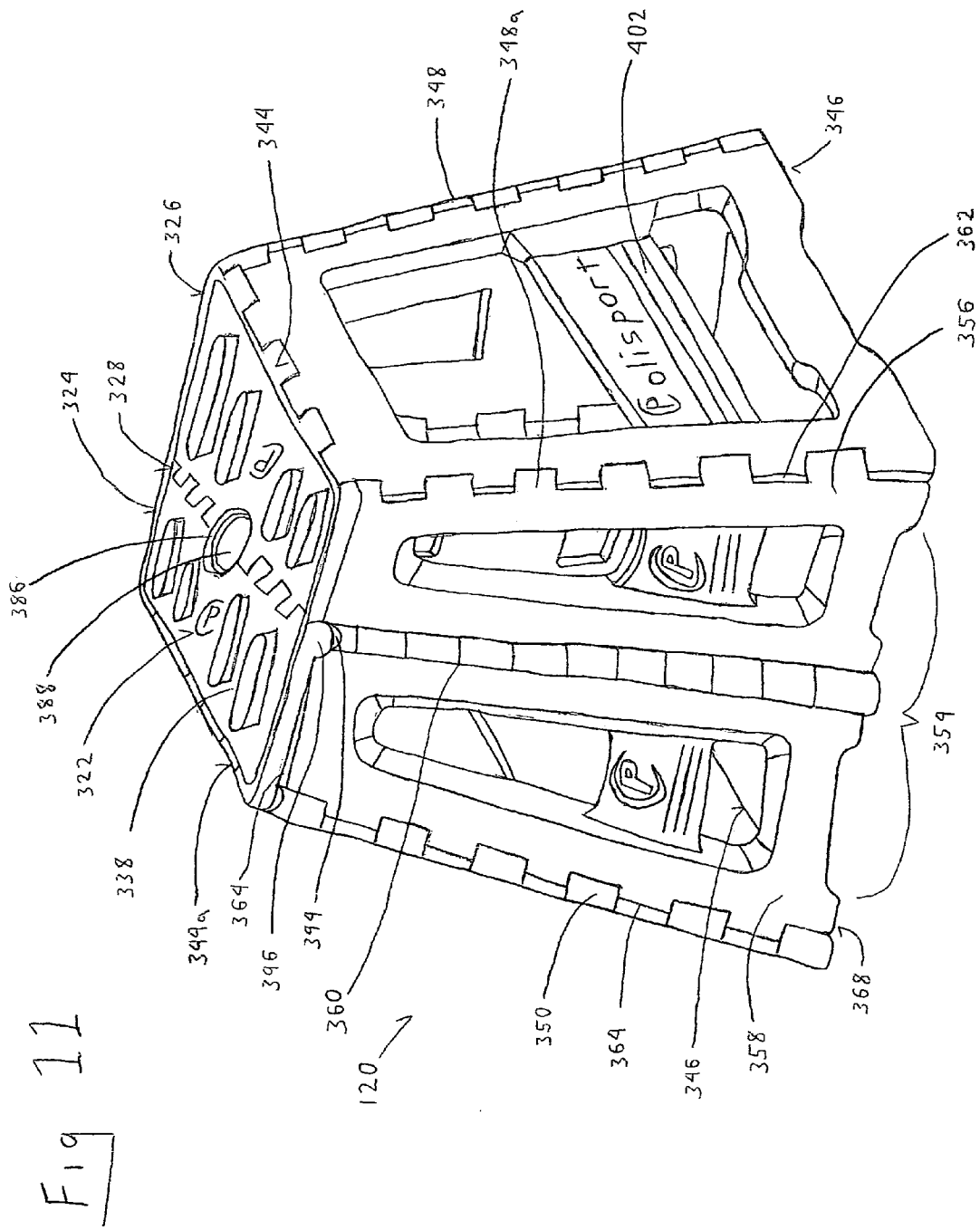

FIG. 11 a side perspective view of the inventive apparatus in an open position.

Figure 12:
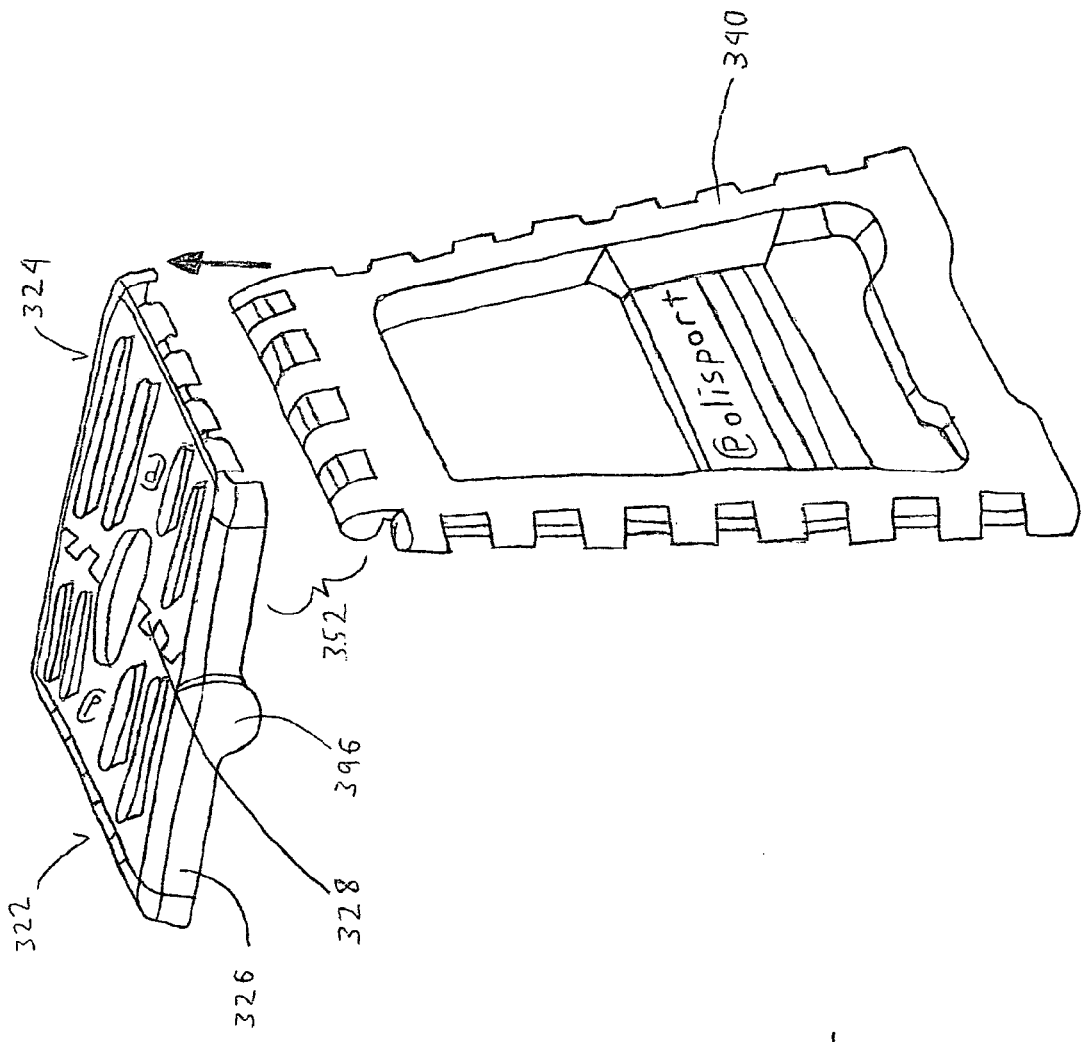

FIG. 12 is a partial exploded view of a rigid member being affixed to the top.

Figure 13:
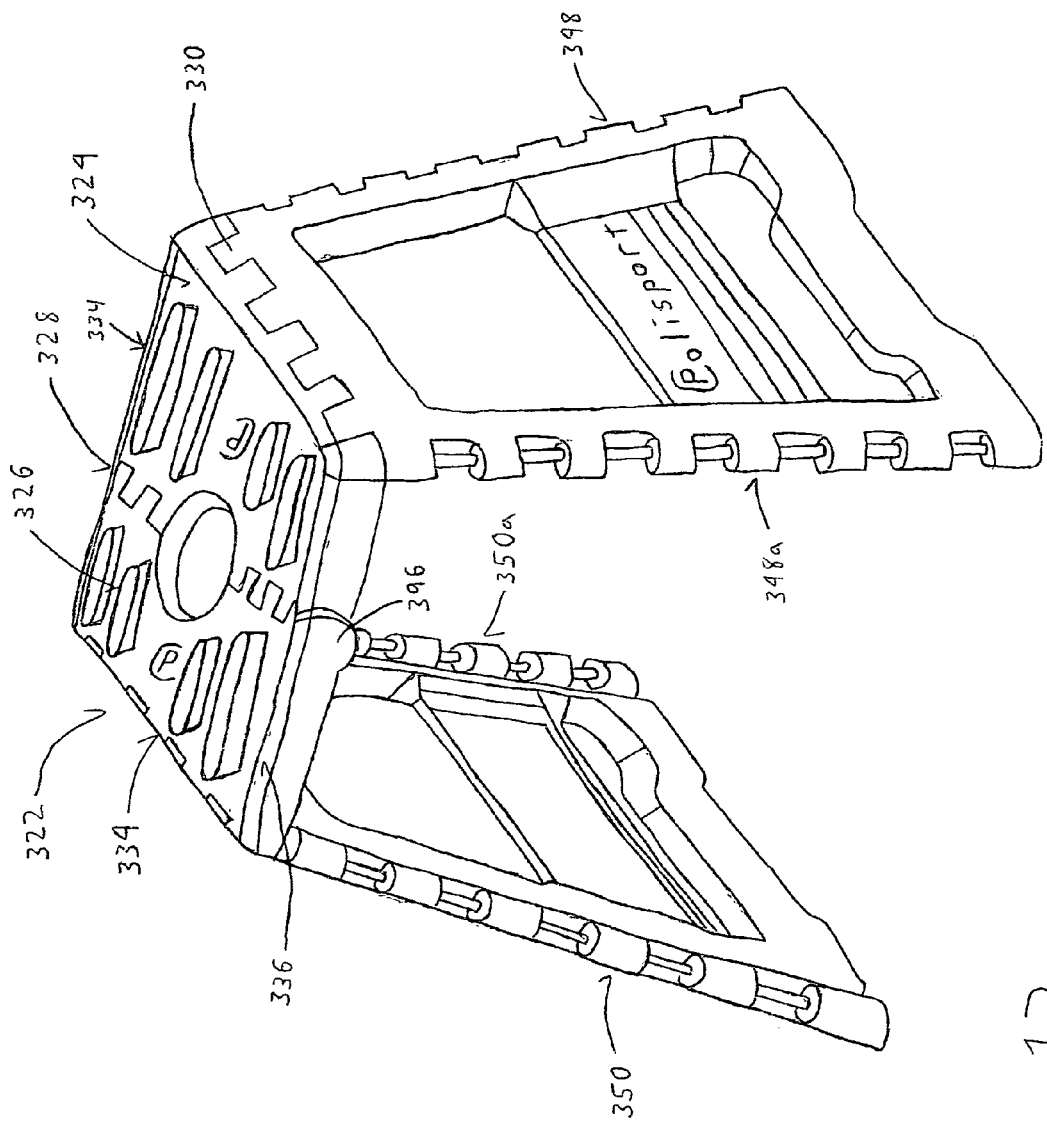

FIG. 13 is a side view illustrating the rigid members in an attached open position without the collapsible members in place.

Figure 14:
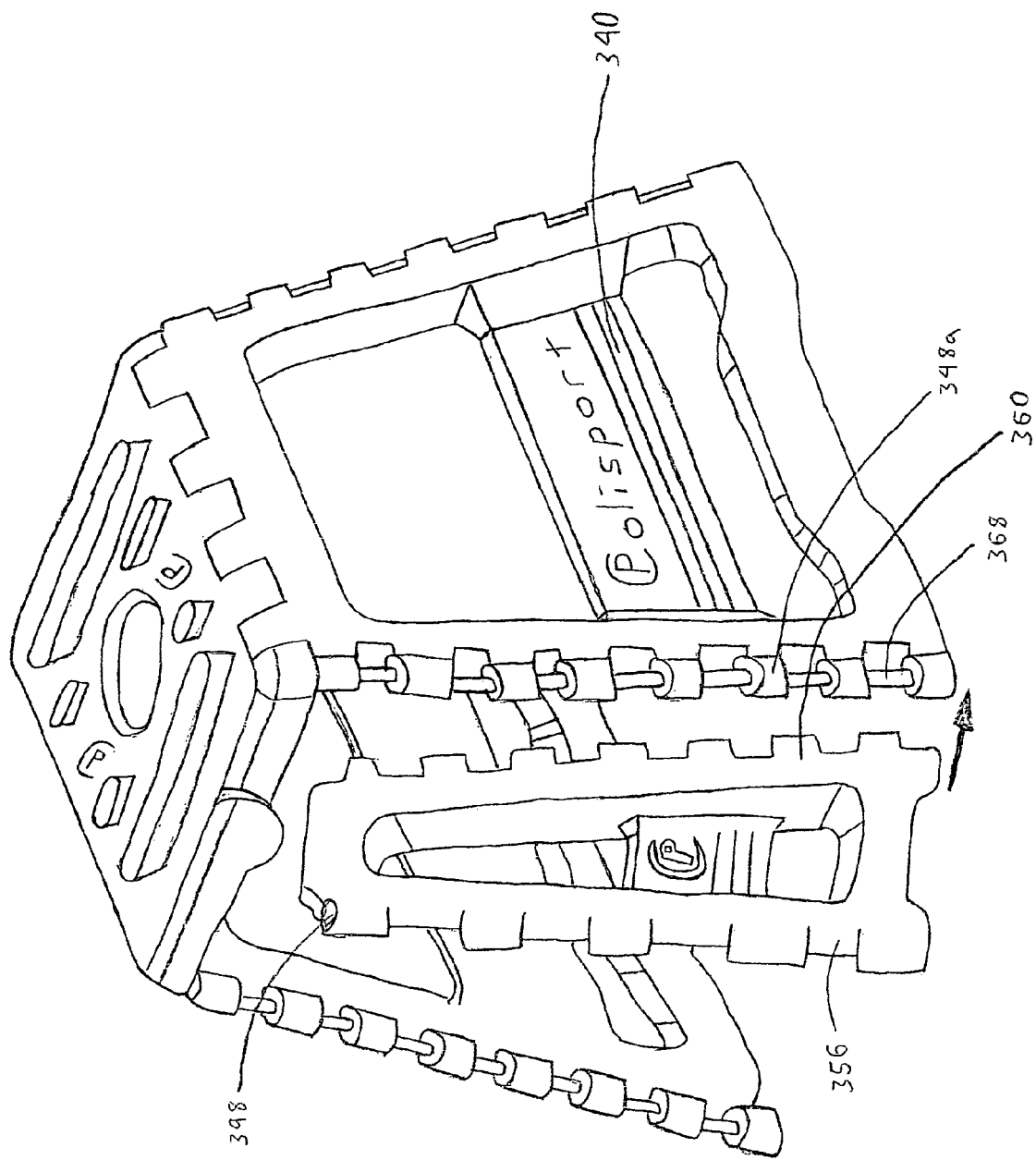

FIG. 14 is a partial exploded view illustrating first collapsible first portion being affixed to a lateral edge of a rigid member.

Figure 15:
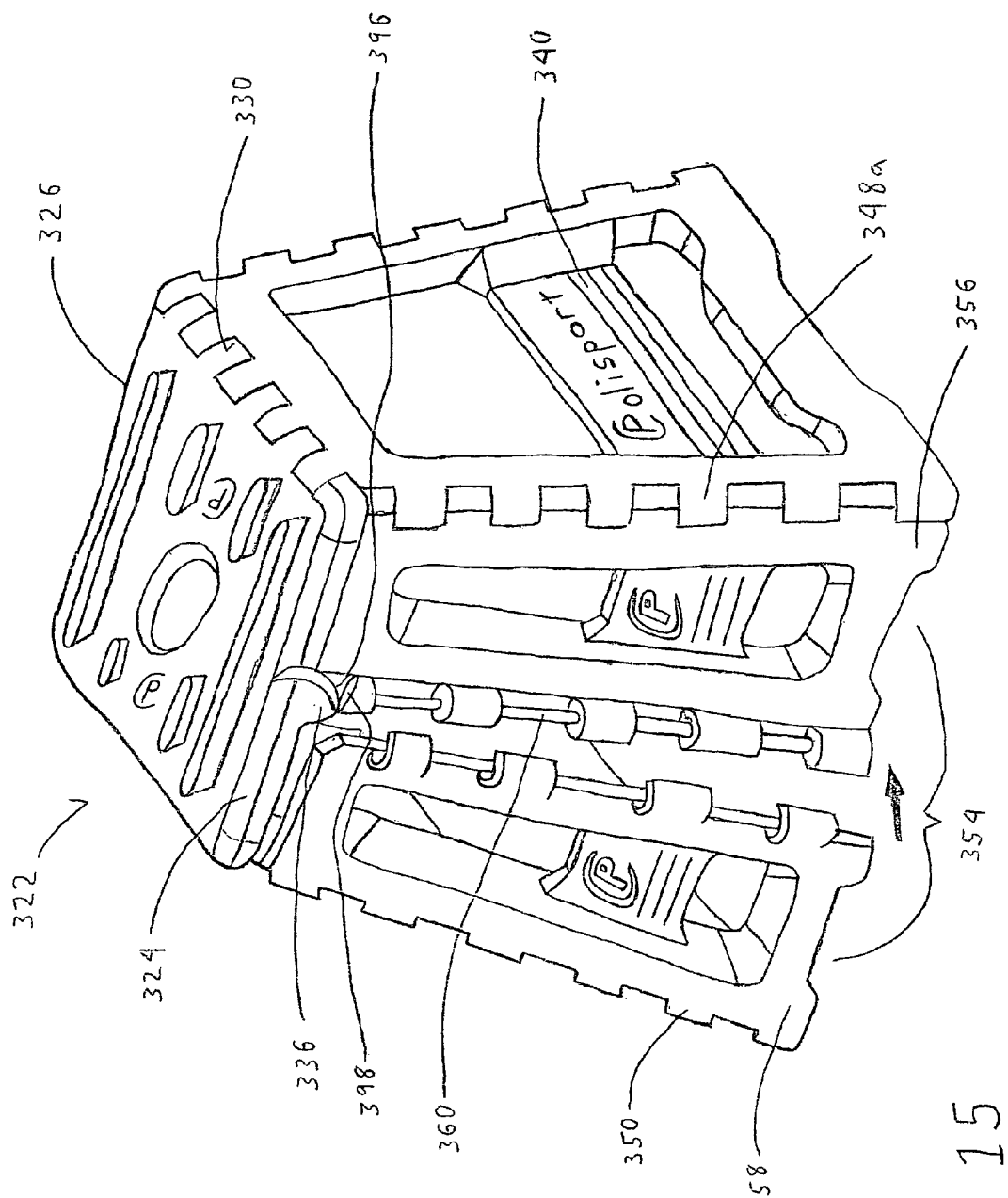

FIG. 15 is a partial view of first collapsible support member attached to the lateral edges of the rigid members and the first collapsible support member hinge in a detached position.

Figure 16:
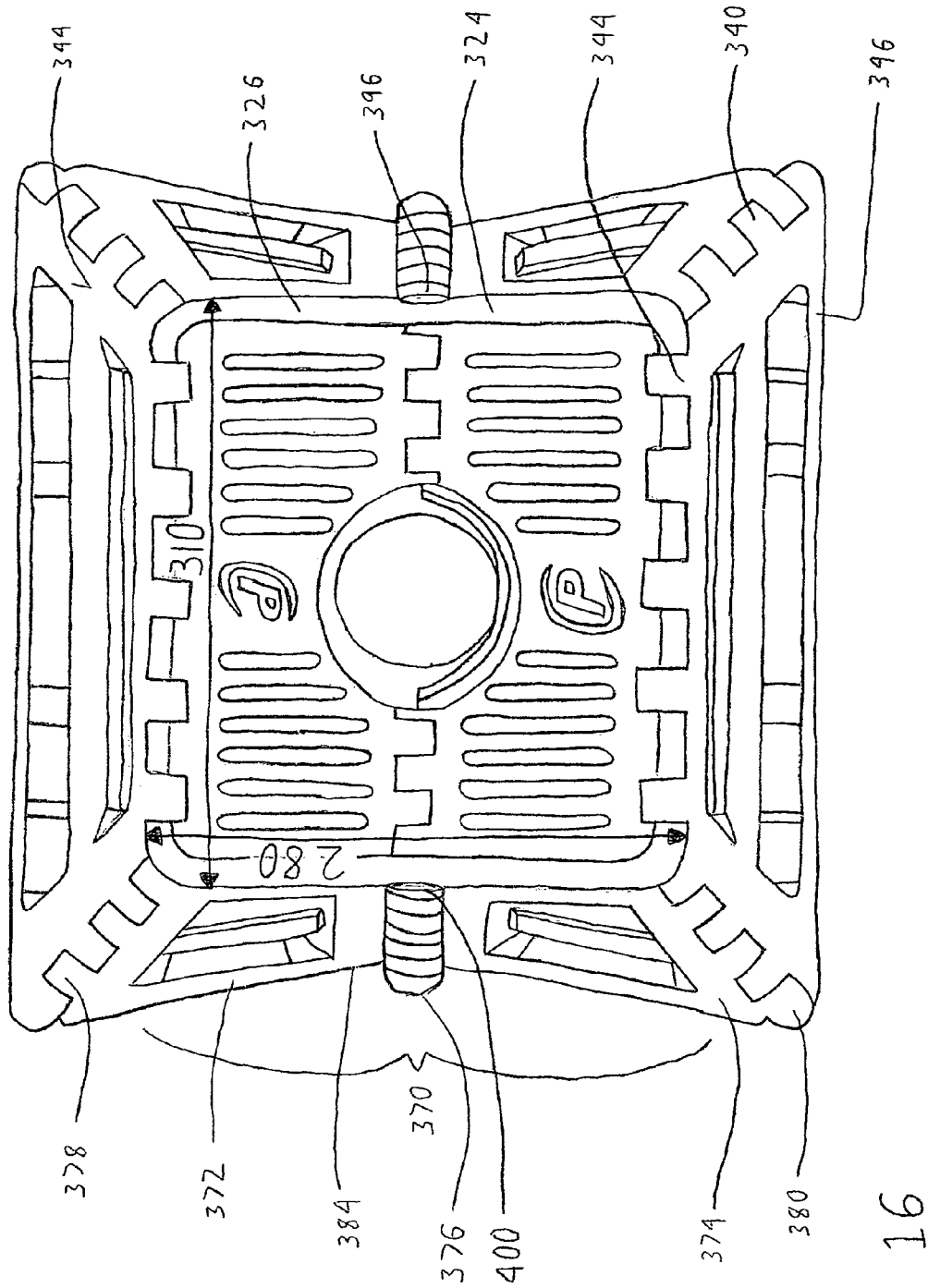

FIG. 16 illustrates a top view of the inventive apparatus in an open position.

Figure 17:
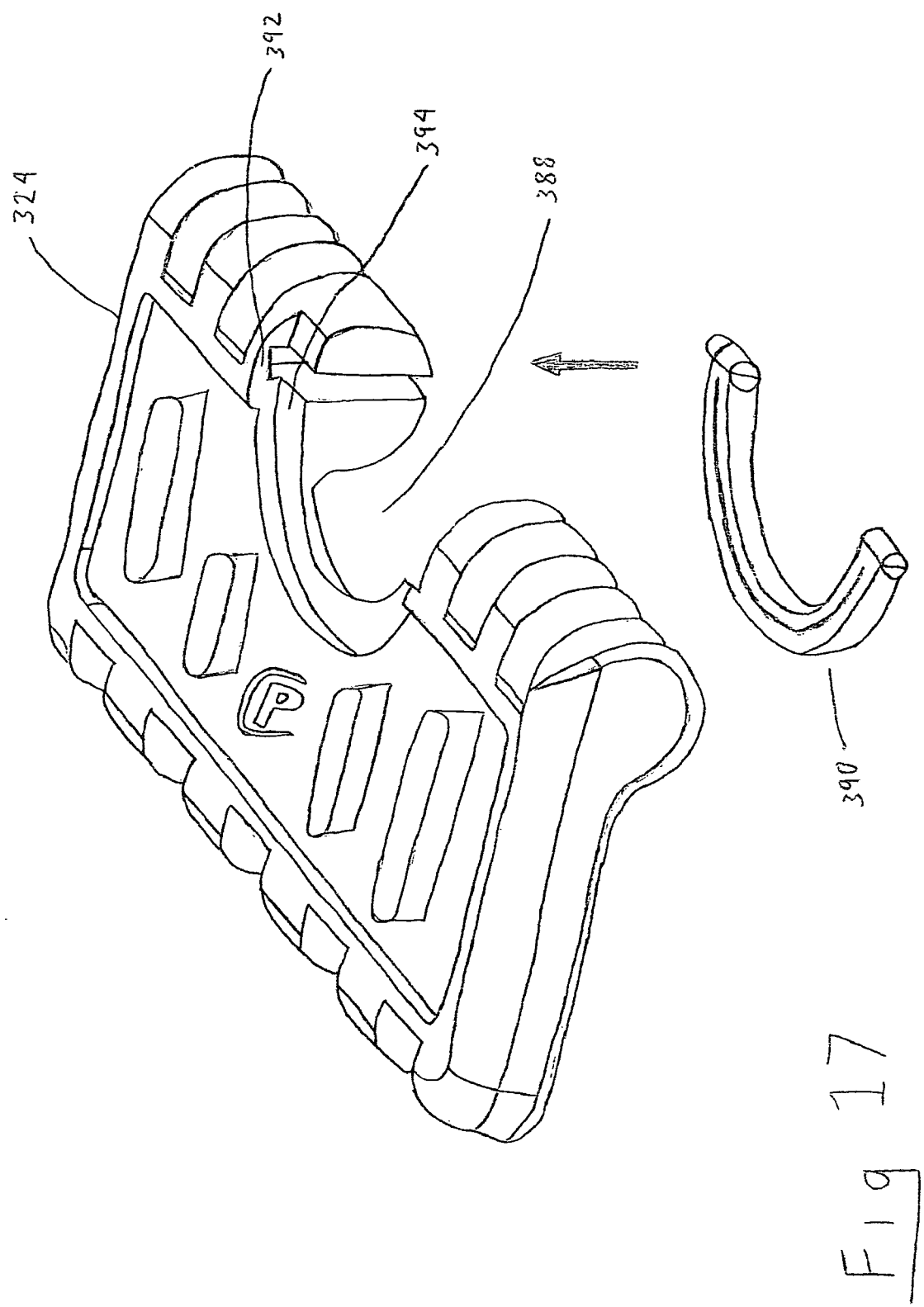

FIG. 17 is a partial exploded view of a top portion illustrating the handle cutout and a detached lifting member.

Figure 18:
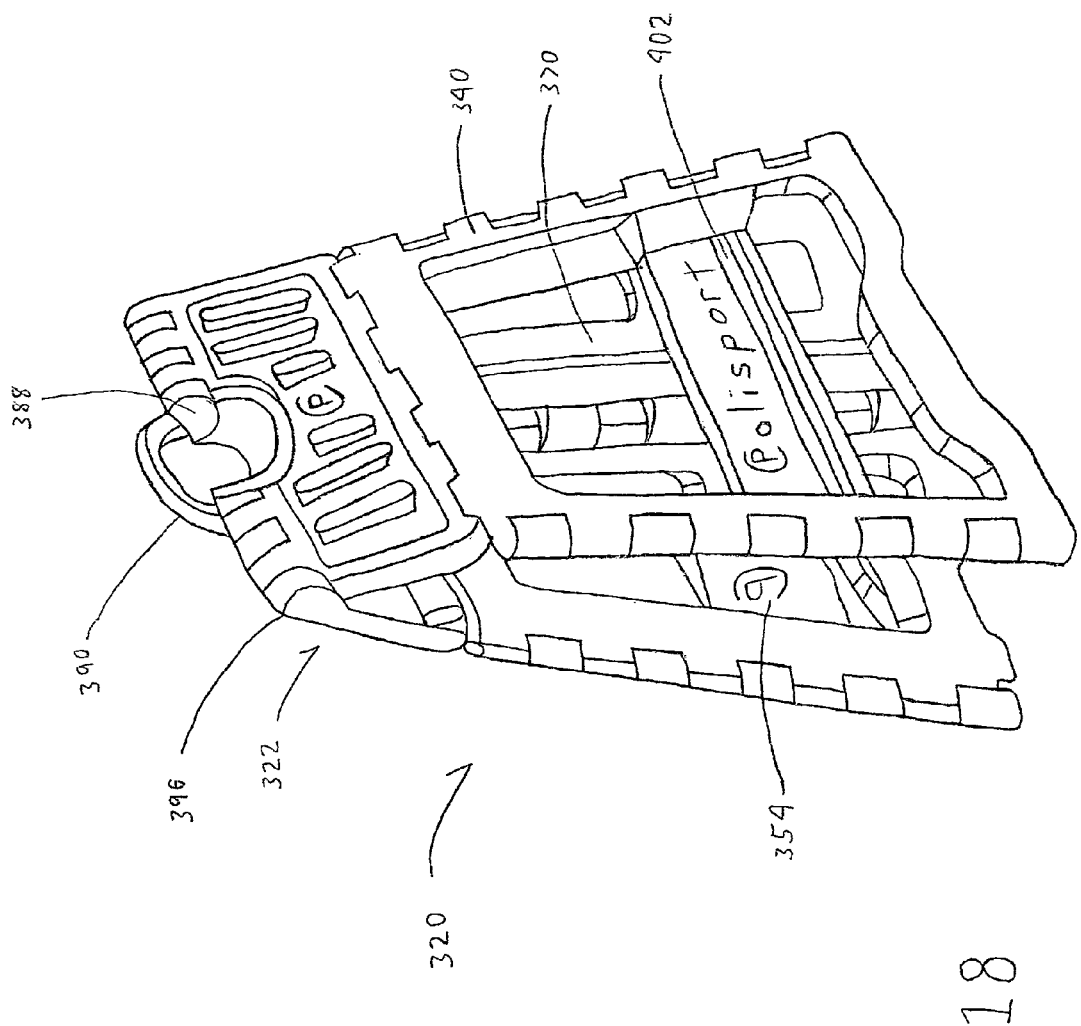

FIG. 18 illustrates the inventive apparatus in a collapsed position.

Figure 19:
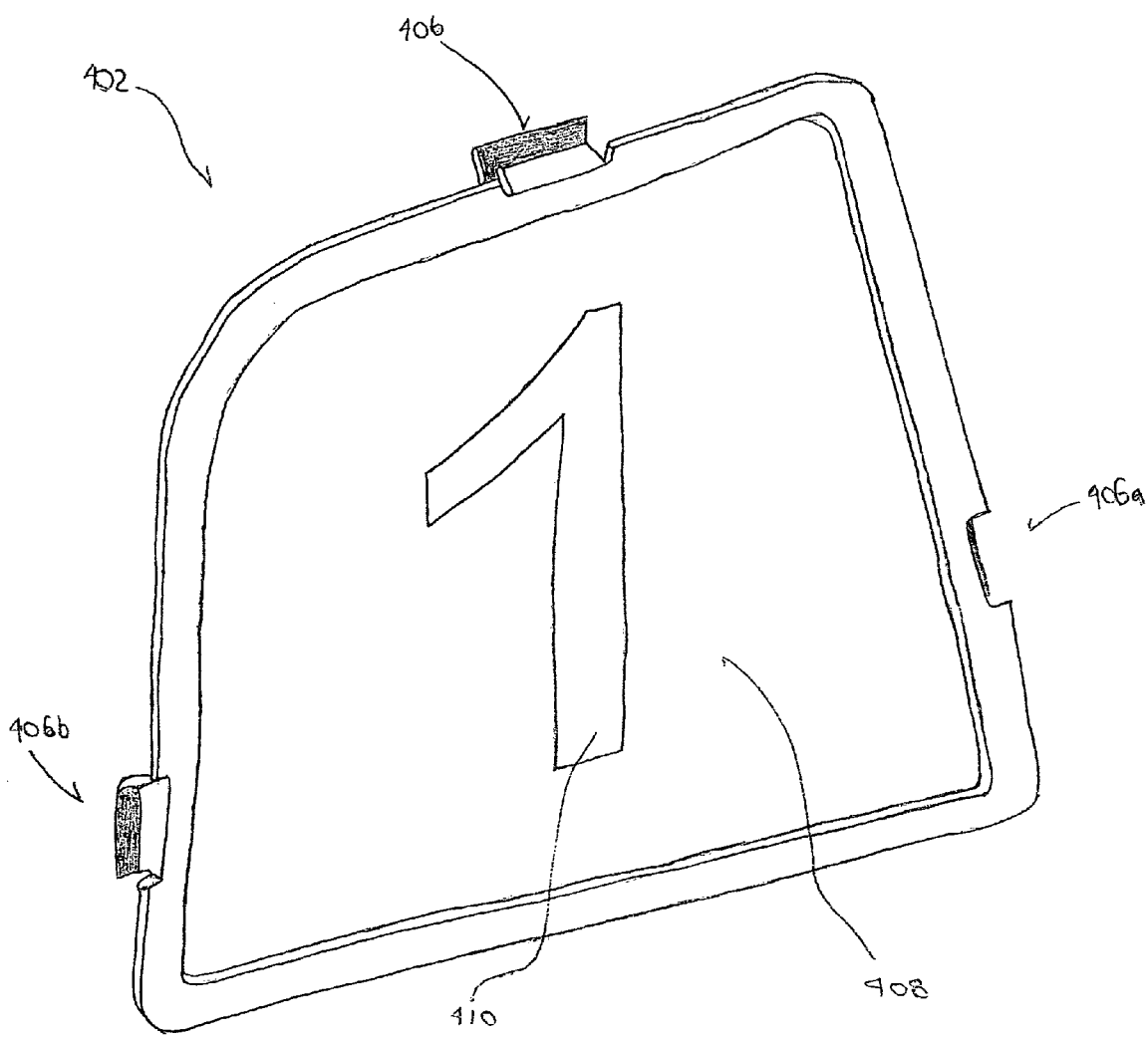

FIG. 19 illustrates a plate for use as an insert in the inventive apparatus

Figure 20:
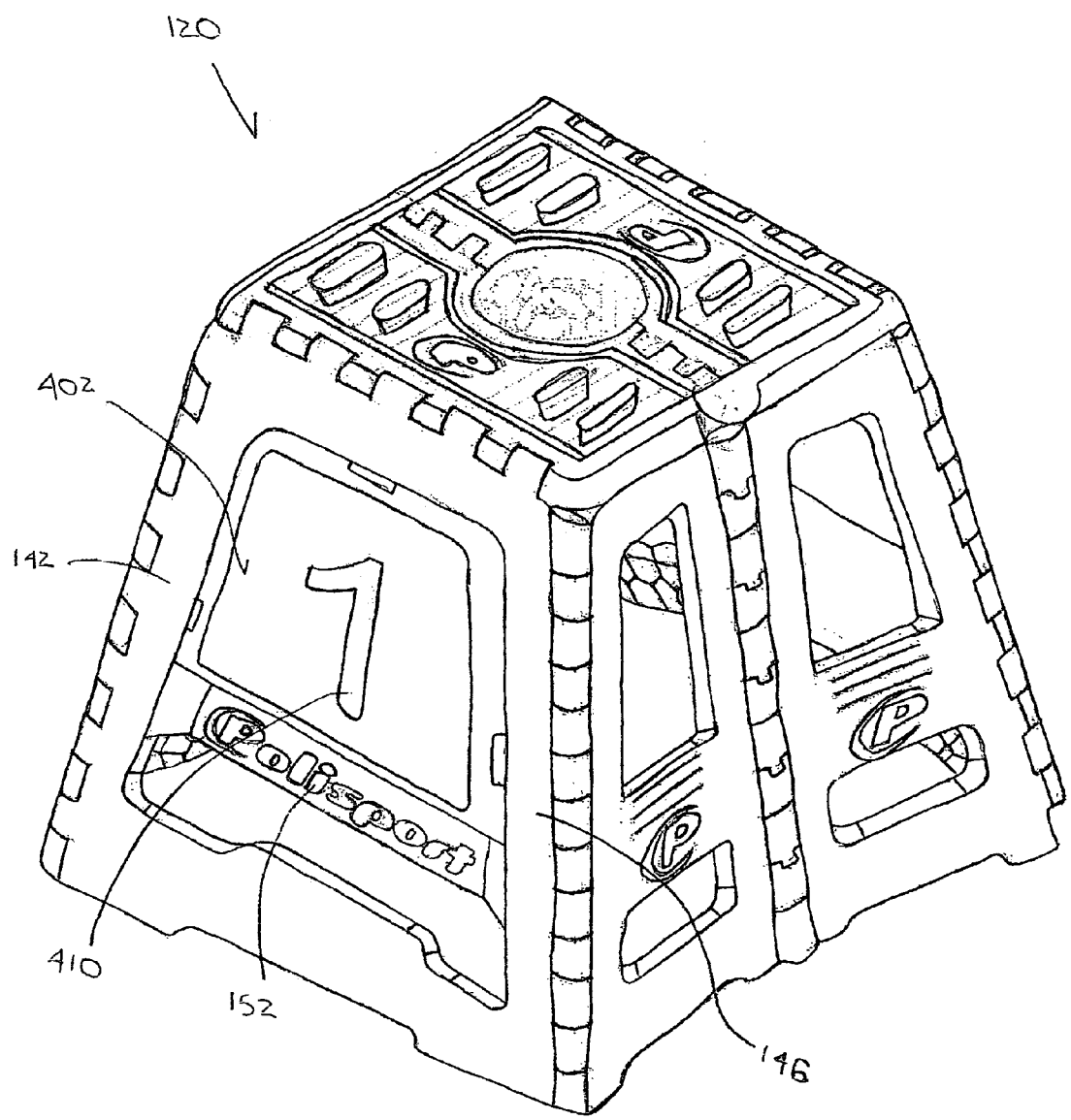

FIG. 20 is a perspective view an alternate embodiment of the inventive apparatus depicting the plate inserted into position.

VI. DETAILED DESCRIPTION OF THE PREFERRED EMBODIMENT

Before explaining the preferred embodiment of the present invention in detail, it is to be understood that the present invention is not limited in its application to the details of formulations and arrangements of the components set forth in the following description. The present invention is capable of other embodiments and of being practiced and carried out in various ways. Also, it is to be understood that the phraseology and terminology employed herein are for the purpose of description and should not be regarded as limiting. It is also to be understood that where ranges are provided for the various agents and drug examples, they are approximate ranges and are not to be limiting except where noted otherwise. It should also be noted that throughout the specification references made to horizontal and vertical assume the apparatus is in an open position and positioned upright with respect to the ground.

Figure 1:
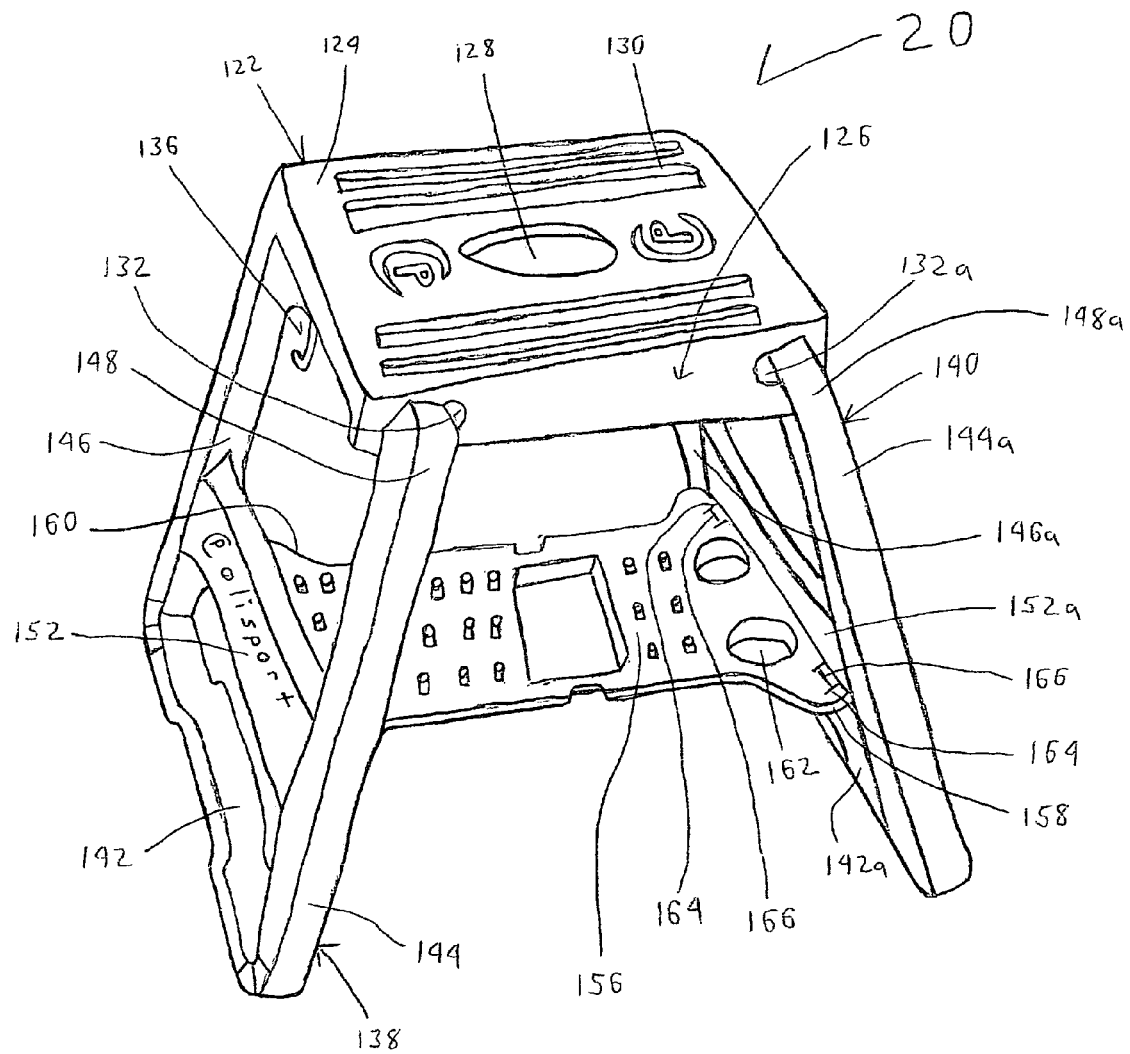
FIG. 1 is a front perspective view of the preferred embodiment.
Figure 2:
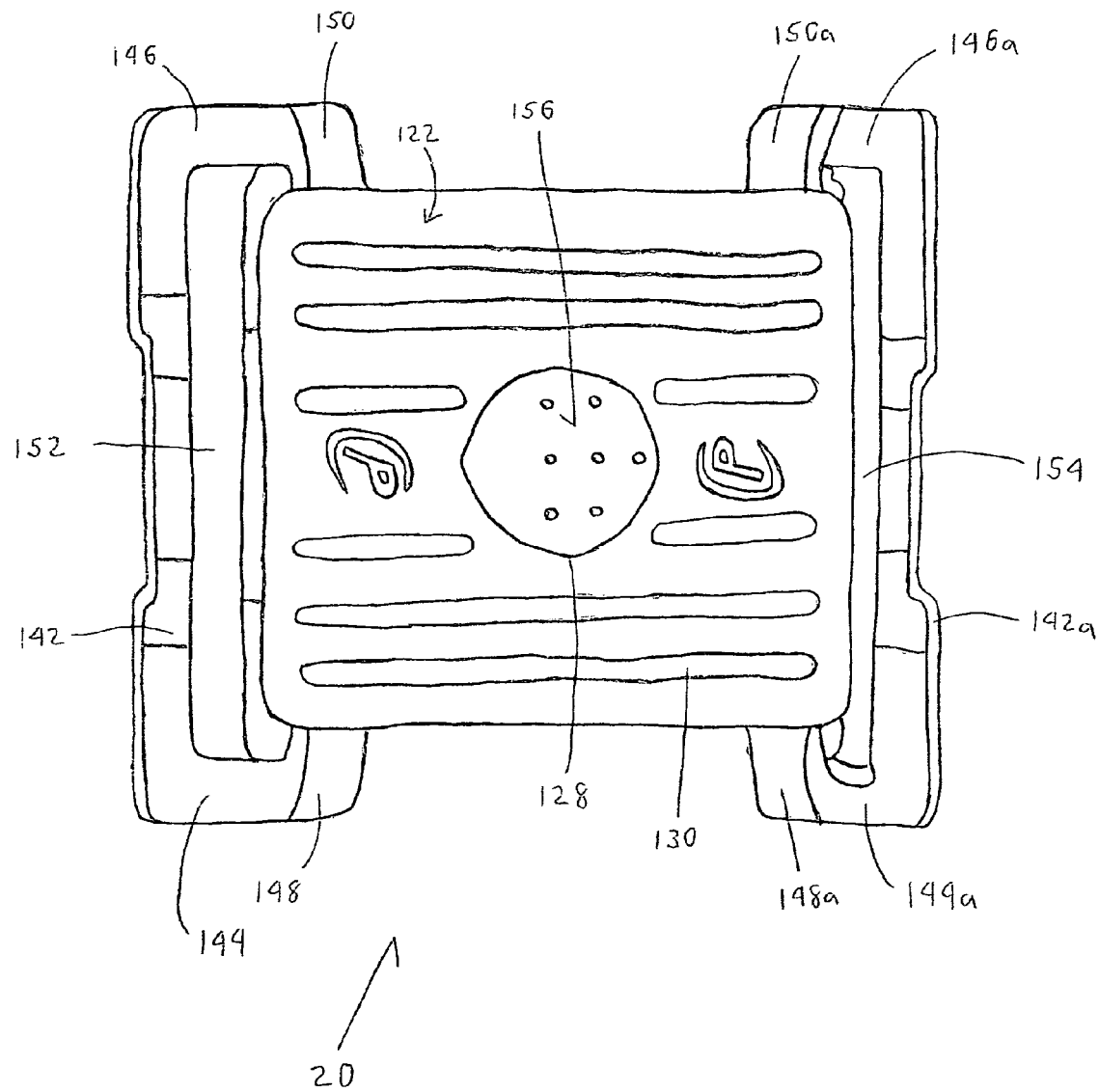
FIG. 2 is a top view of the preferred embodiment.
Figure 3:
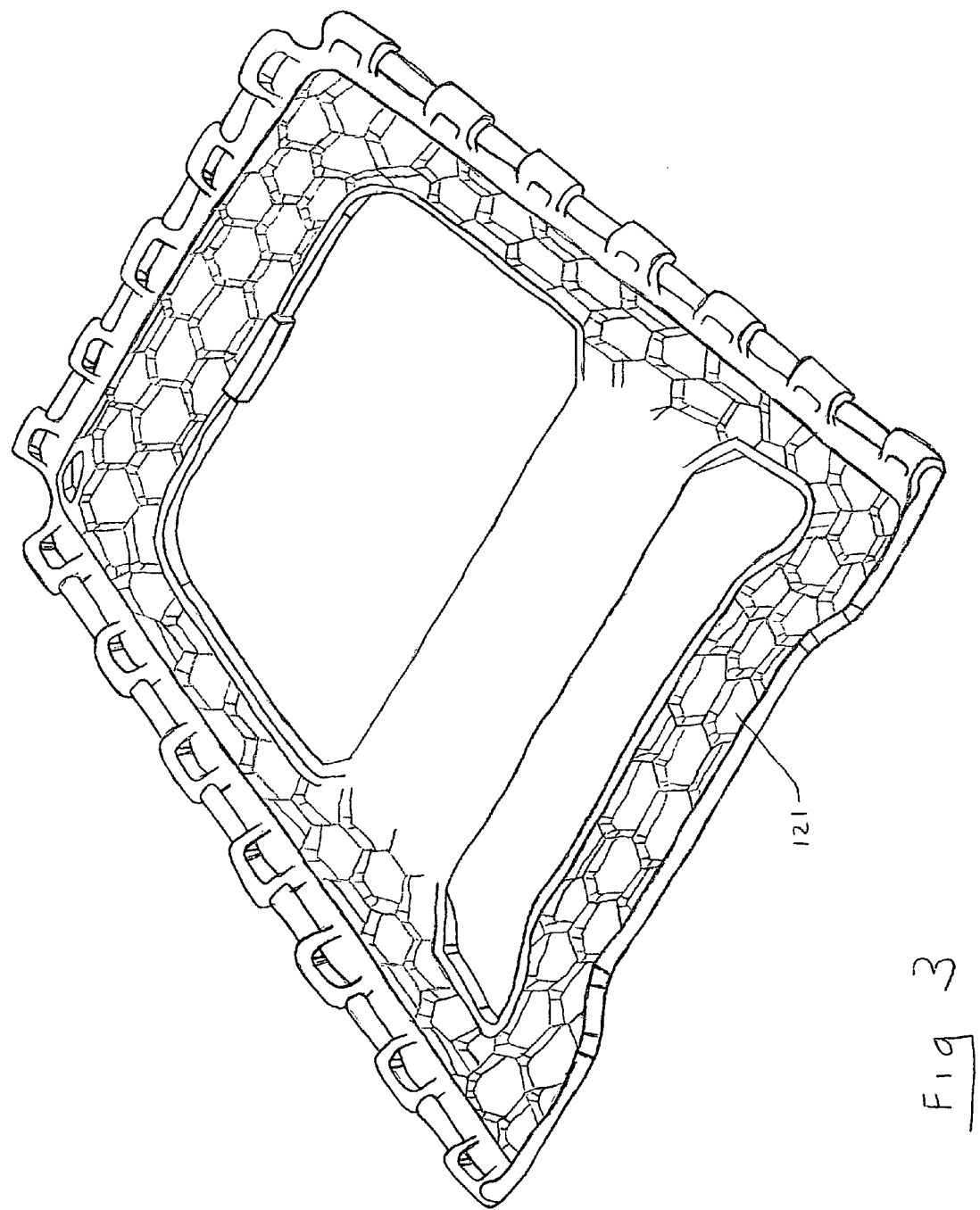
FIG. 3 illustrates a rigid member showing a honeycombing molding technique.

Turning to FIGS. 1 and 2, apparatus 20 is depicted in an open position. As a generally matter, apparatus 20 is made of a rigid lightweight material. In the preferred embodiment it is made of a hard, durable plastic. Apparatus weight is maintained at about seven pounds to about 12 pounds, thereby reducing weight over the prior art by as much as 50% while providing increased reliability, stability, and accessibility. Molding techniques, such as the honeycomb configuration 121 depicted in FIG. 3 add additional strength to apparatus 120 without adding significant weight. Plastic is also resistant to bending and provides significant resistance to fracture, deformation and fatigue. In addition, plastic offers unparalleled strength per apparatus weight, which, using the inventive design enables, support of about 500 pounds, including motorcycle and rider. The use of plastic also enables recycling of the material at the end of the apparatus life cycle.

Apparatus 120 includes platform 122, a generally square or rectangle member having an essentially flat upper surface 124 and an essentially vertical wall 126 about its perimeter. Platform 122 further includes cutout 128 located in its center which may be used as a handle or as a support stabilizer for a motorcycle. Using plastic molding processes that include injection molding enable a manufacturer to also include a softer material so as to create a non-skid surface as is seen in Platform 122 non-skid surface 130. This option feature adds to the versatility of the inventive apparatus as it provides additional stability to a mounted motorcycle and, if molded directly into the platform 122 will keep manufacturing costs down as the non-skid surface does not need to be added at a later time.

Platform 122 further includes four support member receptacles located in wall 126, a first receptacle 132, 132*a* (seen in FIG. 4) and a second receptacle 134, 134*a* (seen in FIG. 5) located along the expanse of wall 126, each receptacle located near the edge of the expanse of wall 126. Finally, platform 122 may include cross bar hook 136 extending in a downwardly direction (from a horizontal positioned platform) from wall 126 on an expanse perpendicular to those wall 126 expanses containing support receptacles.

Rotatably mounted into the support receptacles are first support member 138 and second support member 140. Support members 138, 140 have a base portion 142, 142*a*, a first lateral portion 144, 144*a*, a second lateral portion 146, 146*a*, a first upper horizontal arm 148, 148*a*, and a second upper horizontal arm 150, 150*a* (seen in FIG. 2). Support members 138, 140 are rotatably mounted to platform 122 through the insertion of first upper horizontal arm 148, 148*a*, and second upper horizontal arm 150, 150*a* into support receptacles 132, 132*a*, 134, 134*a*. Traversing support member from first lateral portion 144 to second lateral portion 146 is cross bar 152 and traversing support member from first lateral portion 144*a* to second lateral portion 146*a* is cross bar 154. Cross bars 152, 152*a* provide additional stability and strength to apparatus 120 and also serve to affix shelf 156 into place (described below).

Shelf 156 is a single piece member having a first end 158 and a second end 160 that, when in an open position, extends from cross bar 152 to cross bar 154. Shelf 156 is designed to add stability and strength to apparatus 120 and, further, to hold tools and other items that are deemed necessary by a user. To facilitate securing of tools and other items, shelf 156 may optionally include containers 162.

Figure 4:
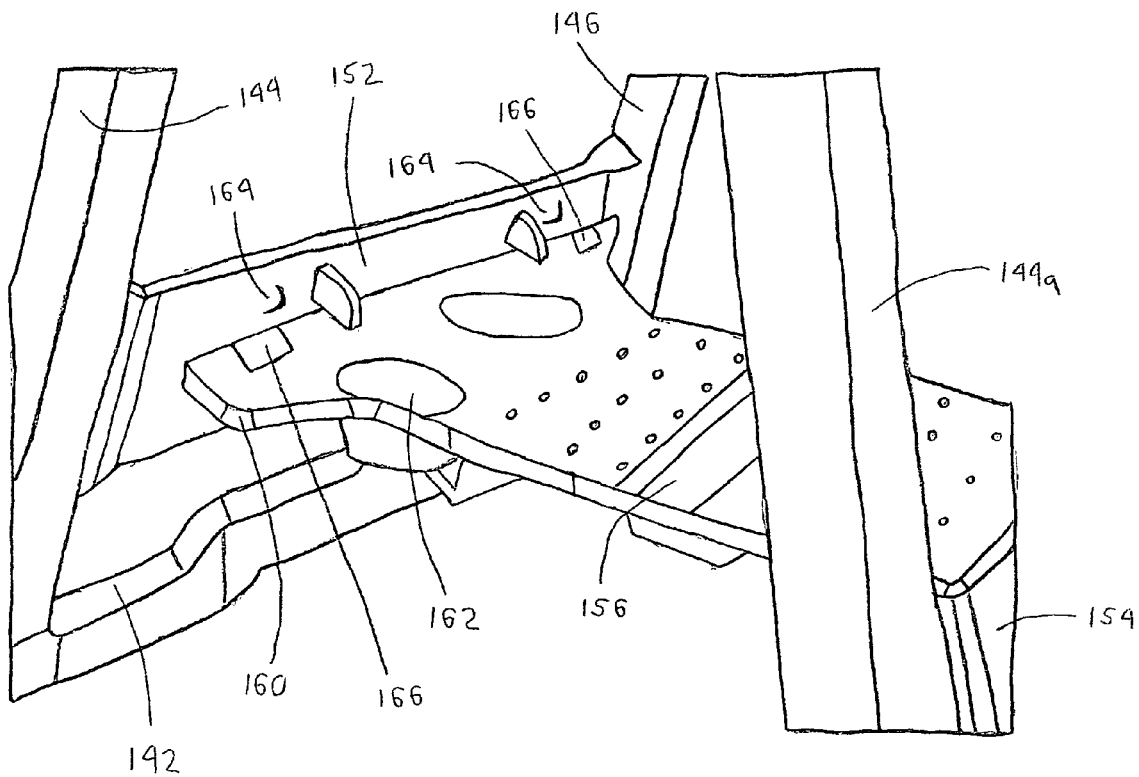
FIG. 4 is a partial perspective view illustrating the hooking mechanism of the shelf in the preferred embodiment.

Shelf 156 is affixed to apparatus 120 via a locking mechanism arrangement. As seen in FIGS. 1 and 4, cross bar 152, 152*a* includes at least one shelf hook receptor 164, 164*a* adapted to receive shelf hook 166, 166*a* located on first end 158 and second end 160 of shelf 156. The reversible connection created at this junction enables shelf 156 to be secured into place and to further maintain apparatus 120 in a solid, stable position.

To collapse apparatus 120, a user snaps shelf 156 from the locking mechanism created by shelf hook receptor 164, 164*a* and shelf hook 166, 166*a*. Vertical force is then exerted on platform 122, thereby causing support members 138, 140 to move towards one another.

Figure 5:
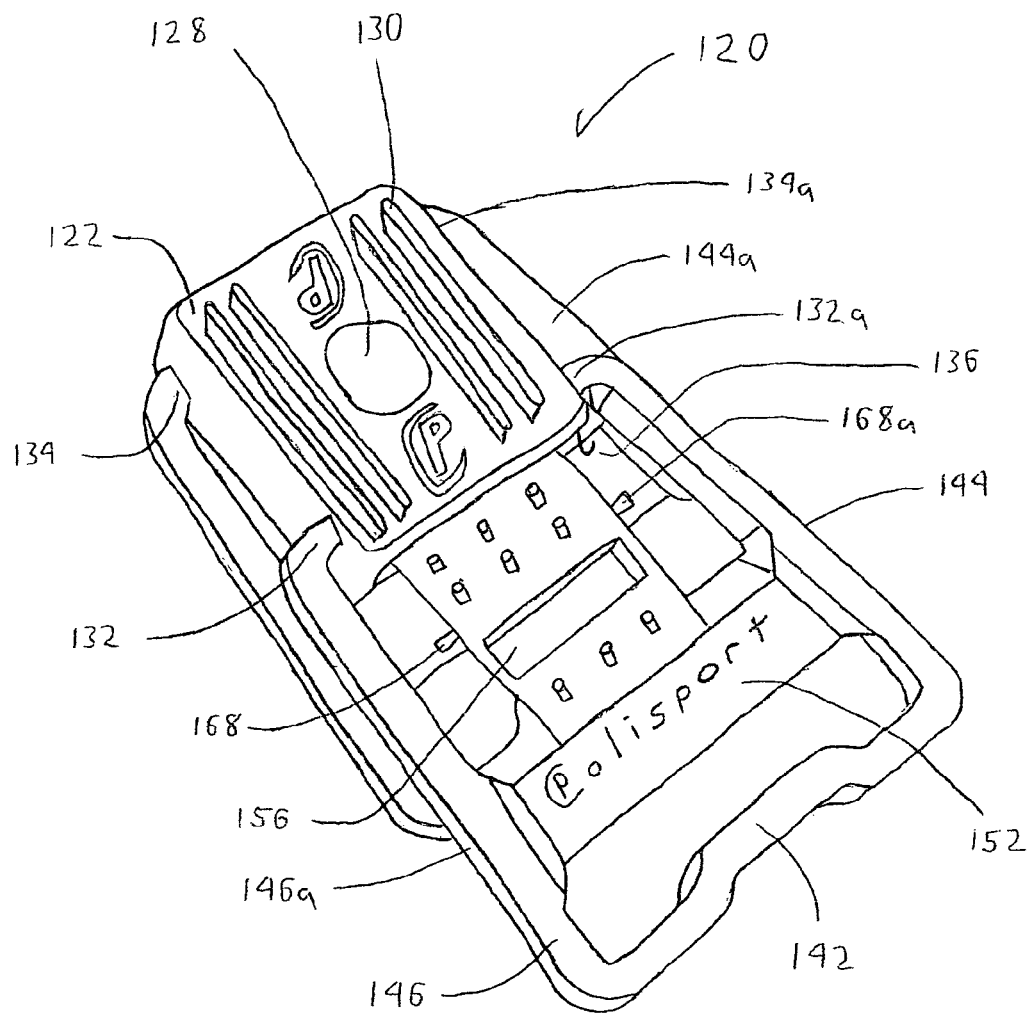
FIG. 5 is a top perspective view of the apparatus in a collapsed position.

Turning to FIG. 5, apparatus 120 is depicted in a collapsed position. Shelf 156 has been removed as described above and placed in a stowed position, secured in place by shelf locks 168, 168*a*. Apparatus 120 is held securely in a collapsed position by cross bar hook 136 which is snapped into position on cross bar 152*a*.

Turning to FIG. 6, an alternate embodiment of inventive apparatus 120 is shown. The scope and spirit of the invention are maintained. In this embodiment, however, apparatus 120 is modified such that shelf 156 is a two-piece member (shelf 156 is now labeled 256 in this embodiment) having a first section 258 and a second section 260. First section 258 and second section 260 are connected to one another via first hinge 262.

Platform 122 is also slightly modified such that support member receptacles 148*a*, 150*a* have an opening 264, 264*a* in their lower aspects in wall 126. This modification is for the purpose of accepting second support member 140 which is modified such that first horizontal arm 148*a* and second horizontal arm 150*a* are replaced with upper horizontal portion 266 which extend the entire horizontal expanse from lateral portion 144*a* to lateral portion 146*a*.

Shelf 256 is rotatably affixed to cross bars 152, 152*a* wherein first section 258 is rotatably connected to cross bar 152 via second hinge 268 and second section 260 is connected to cross bar 152*a* via third hinge 270.

Apparatus 120 further includes secondary cross bars 272, 272*a* which are two-piece members having secondary first section 274, 274*a* and secondary second section 274, 274*a* joined together at fourth hinge 278, 278*a*.

In this embodiment, shelf 256 remains attached to apparatus 120 in both the collapsed position and the open position. In use in this embodiment, and turning to FIG. 7, to collapse apparatus 120, upward force is exerted on platform 122 to release upper horizontal portion 266 from opening 264. Downward force is then applied to shelf 256 while simultaneously applying inward pressure on secondary cross bars 272, 272*a* at fourth hinge 278, 278*a* (FIG. 8). As is seen in FIG. 8, this, in turn, causes apparatus to 120 to collapse into a folded position. Deploying apparatus 120 to an open position is accomplished by reversing them above steps.

Figure 10:
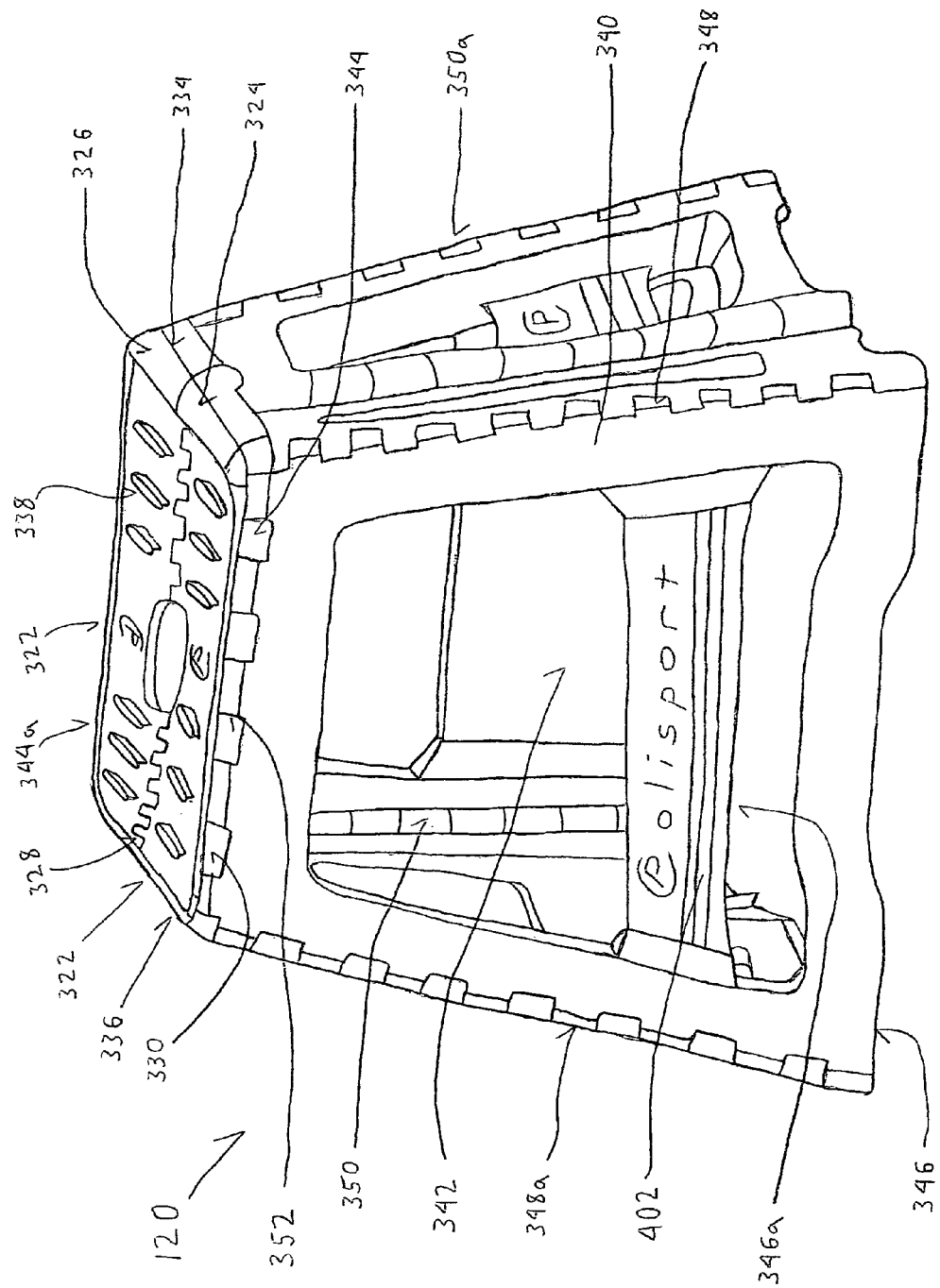
FIG. 10 is a front perspective view of a second alternate embodiment of the inventive apparatus in an open position.

Turning to FIG. 10, another alternate embodiment of the invention is depicted in a front perspective view of inventive apparatus 120 in an open position is illustrated. Apparatus 120 further includes top 322, which further comprises a first section 324, and a second section 326, the first section and second section are connected to one another via a first hinge 328 (better seen in FIG. 11). The top has a perimeter being defined by a first outer edge 330, a second outer edge 332, a third outer edge 334, and a fourth outer 336. Top 322 is generally edge each of which is of a predetermined length. Top 320 is generally of a square configuration but any rectangle configuration will work within the scope of the invention. Top 322 may optionally include non-skid surface 38.

Also seen in FIG. 10 are first rigid member 430 and second rigid member 342, each of which further include a top edge 344, 344a and a bottom edge 346,346a (better seen in FIG. 11), a first lateral edge 348, 348a and a second lateral edge 350 (better seen in FIG. 11), 350a, the first rigid member 340 being connected to the first section 324 via second hinge 352 along the length of the first outer edge 330 and second rigid member 342 connected to the second section 326 via third hinge 352a along the length of the third outer edge 334. FIG. 12 illustrate first rigid member 340 detached from top 322 and showing the manner in which it is positioned wherein rigid member 340 is snapped into first outer edge 330. Turning to FIG. 12, both rigid member 340 and rigid member 342 are seen in an attached open position.

Turning to FIG. 12, first collapsible support member 354 further comprising a first collapsible support member first portion 356 and a first collapsible support member second portion 358, the first collapsible support member first portion 356 and the first collapsible support member second portion 358 being connected to one another via fourth hinge 360, first collapsible support member 354 further having a first collapsible support member first lateral edge 362, a first collapsible support member second lateral edge 364, a first collapsible support member top edge 366 and a first collapsible support member bottom edge 368. First collapsible support member first lateral edge 362 is rotatably connected to second lateral edge 348a of the first rigid member 340 and the first collapsible support member second lateral edge 364 is rotatably connected to a lateral edge 350 of the second rigid member. Turning to FIG. 14, the attachment of first collapsible support member 354 first portion 356 to first rigid member 340 can be seen wherein first portion 356 is shown detached at fifth hinge 368.

Second collapsible support member 370 (best seen in FIG. 16) is configured and positioned similarly to first collapsible support member 354 on the opposite side, adjacent top outer edge 334, and includes a second collapsible support member first portion 372 and a second collapsible support member second portion 374, sixth hinge 376, second collapsible support member first lateral edge 378, a second collapsible support member second lateral edge 380, a second collapsible support member top edge 382 (not seen in FIG. 16) and a second collapsible support member bottom edge 384. Attachment for second collapsible support member is identical to that first collapsible support 354 only it is done on the opposite side adjacent outer edge 334.

Returning to FIG. 11, top 22 further can optionally include a handle 386. Handle 86 comprises a circular cut out 388, half of which is contained within first section 324 and half of which is contained in t second section 326 and encompasses an interior space (not numbered). Turning to FIG. 16, the handle further including a semi-circular lifting member 390 of a size such that it nestles into the cut out. Cutout 388 further includes wall 392 and floor 394 into which lifting member 390 rotatably fits and rests when not in use.

It can be seen in the various figures that each of rigid members 340, 342 and collapsible support member 354, 370 include an interior space including a cross bar (identified as 402 on a representative cross bar. Using a single representation is done for clarity and it should be understood that each rigid member and each collapsible member also include similar features for similar reason). An interior space results in a reduction of weight while cross bar 402 provides additional strength. Those skilled in the arts will understand that the rigid members and the collapsible members could be solid or include a varying number of cross bars and be within the scope and spirit of the invention.

Returning to FIG. 16, it is seen that when apparatus 120 is in an open position, the angle created by the first rigid member 340 top edge 344 and bottom edge 346 with respect to top 230 is greater than 90 degrees and the angle created by the second rigid 342 member top edge 344a and bottom edge 346a than 90 degrees, the angles created by first rigid member 340 and second rigid member 342 being equal to one another. Likewise, the angle created by the first collapsible support member 354 top edge 366 and the bottom edge 368 with respect to top 322 is greater than 90 degrees and the angle created by the second collapsible support member 370 top edge 382 and the bottom edge 384 with respect to top 322 is greater than 90 degrees, the angles created by the first collapsible support member 354 and the second collapsible support member 370 being equal to one another.

Also in FIG. 16 it is seen that when apparatus 120 is in an open position, first collapsible support member 354 and second collapsible support member 370 open to a position wherein a concave angle is created with respect to top 322. This angle provides apparatus with additional, significant stabilization and support that is not seen or taught in the prior art. The angle can vary in degree depending on the size and configuration of top 320, and overall height of apparatus 120. As those skilled in the arts will appreciate, the angle will be dictated by those factors. The inventor has found, however, that the concave angle will be in a range of about 5 degrees to about 45 degrees.

Further, when in an open position, and referring to FIG. 15, top 320 includes knob 396 which sets into cradle 398 of first collapsible supporting member first portion 356. Likewise, the opposite side wherein top 322 rests on second collapsible supporting member 370 there is a similar configuration (knob 400 can be seen in FIG. 16). This configuration of protrusion and cradle serve to lock apparatus 120 into place while in an open position, thereby providing additional safety, stability, and strength.

In use, to place inventive apparatus 120 in an open, usable position, downward force is exerted on top 322 such that first section 324 and second section 326 rotate about hinge 328 to a horizontal position. Simultaneously, the first collapsible support member 54 and second collapsible support member 370 rotate about hinges 360, 376, respectively, to a concave position with respect to top 322 such that the second outer edge 334 and the fourth outer edge 336 of top 322 come to rest along top edges 364, 380 of the first collapsible support member 54 and second collapsible support member 370, respectively. When in a fully opened position, knobs 96, 400 rest in cradle 98 and the corresponding cradle of second collapsible support member 370 (not shown).

Once apparatus has been used and is to be stowed, and as illustrated in FIG. 17, apparatus 20 can be collapsed by exerting upward force on top 22 by using handle lift 90 such that first section 24 and the second section 26 rotate about hinge 28 in an upwardly direction to a collapsed position and first collapsible support member 54 and second collapsible support member 70 rotate about their hinges 60, 76 in an inwardly direction to a folded position.

Apparatus 120 can also include a plate inserted into the area formed in the various embodiment support members. Plate 402 is depicted in FIG. 18. Plate 402 is sized so that it is of a depth 404 essentially equal to the thickness of the lateral portions and above the cross bars (as seen in FIG. 20). Plate 402 is secured with snaps 406, 406*a*, 406*b* which snap into place on the backside of the lateral portions 144, 144*a* 146, 146*a* and the crossbars 152, 152*a*. Plate 402 provides a surface 408 can be used to include indicia 410 that identifies or advertises, as desired.

It is to be understood, however, that even though numerous characteristics and advantages of the preferred and alternative embodiments have been set forth in the foregoing description, together with details of the structure and function of the embodiments, the disclosure is illustrative only, and changes may be made in detail within the principles of the invention to the full extent indicated by the broad general meaning of the terms in which the appended claims are expressed.

We claim:

1. A collapsible, portable motorcycle stand comprising:
    a platform having a generally rectangular shape, a vertical wall encompassing the perimeter of the generally rectangular shape, at least four support member receptacles located in the wall;
    at least two support members, the at least two support members further comprising a first lateral portion, a second lateral portion, a bottom portion, and a first horizontal arm and a second horizontal arm, the first and second horizontal arms being adapted to rotatably mount to the support member receptacles, and at least one cross bar extending from the first lateral portion to the second lateral portion, the cross bars further including at least one shelf hook receiver; and,
    a shelf having a first end and a second end, the first end and second end further including at least one hook for reversibly joining to the shelf hook receivers.

2. The motorcycle stand of claim 1 wherein the shelf further includes containers for holding tools or other items.

3. The collapsible motorcycle stand of claim 1 wherein the platform further includes a non-skid surface.

4. The motorcycle stand of claim 1 comprising a lightweight, durable material.

5. The lightweight material of claim 4 being plastic.

6. The plastic of claim 5 being molded to include a honeycomb pattern to decrease weight and increase strength.

7. The motorcycle stand of claim 1 wherein one cross bar further includes at least one shelf lock for holding the shelf in place in a collapsed position.

8. The motorcycle stand of claim 1 wherein the platform further includes cross bar hook for securing the motorcycle stand in a collapsed position.

9. The motorcycle stand of claim 1 further including a removable plate that reversibly affixes to the support members, the plate for enabling the addition of indicia.

10. The motorcycle stand of claim 1 wherein the rectangular shape of the platform includes a square.

\* \* \* \* \*